(12) United States Patent
Takahasi et al.

(10) Patent No.: US 6,890,578 B1
(45) Date of Patent: May 10, 2005

(54) ACIDIC PROTEIN FOODS, PROCESS FOR THEIR PRODUCTION AND STABILIZER

(75) Inventors: Taro Takahasi, Ibaraki (JP); Junko Tobe, Ibaraki (JP); Hitoshi Furuta, Ibaraki (JP); Ryosuke Kiwata, Ibaraki (JP)

(73) Assignee: Fuji Oil Co., Ltd., Osaka (JP)

( * ) Notice: Subject to any disclaimer, the term of this patent is extended or adjusted under 35 U.S.C. 154(b) by 116 days.

(21) Appl. No.: 09/936,755

(22) PCT Filed: Jul. 4, 2000

(86) PCT No.: PCT/JP00/04422

§ 371 (c)(1),
(2), (4) Date: Sep. 17, 2001

(87) PCT Pub. No.: WO01/15540

PCT Pub. Date: Mar. 8, 2001

(30) Foreign Application Priority Data

Aug. 27, 1999 (JP) .......................................... 11/240787

(51) Int. Cl.⁷ .......................... A23L 1/0524; A23L 2/66
(52) U.S. Cl. ....................... 426/577; 426/520; 426/590; 426/599
(58) Field of Search ................................ 426/577, 590, 426/599, 520

(56) References Cited

U.S. PATENT DOCUMENTS 5,498,702 A * 3/1996 Mitchell et al. ................ 536/2
5,607,714 A * 3/1997 Connolly .................... 426/599
5,690,975 A * 11/1997 Akahoshi et al. ............. 426/34
5,900,268 A    5/1999 Mazoyer et al.
6,143,337 A * 11/2000 Fishman et al. ............ 426/241

FOREIGN PATENT DOCUMENTS

| EP | 709033 | 5/1996 |
| EP | 0 868 854 A3 | 10/1998 |
| EP | 0 868 854 A2 | 10/1998 |
| EP | 0 958 746 A1 | 11/1999 |
| FR | 2 789 267 | 8/2000 |
| GB | 2311024 | 9/1997 |
| JP | 3-201943 | 9/1991 |
| JP | A-5-252972 | 10/1993 |
| JP | A-7-264977 | 10/1995 |
| JP | A-10-4894 | 1/1998 |
| JP | 10-313781 | 12/1998 |
| WO | 97/03574 | * 6/1997 |

OTHER PUBLICATIONS

XP 000604284, dated Oct. 4, 1996, Title: Casein–Pectin Interaction in Sour Milk Beverages, 3 pages double–sided.
XP–002096810, dated 1994, Preparation and Physiological Effect of Low–Molecular–Weight Pectin, 2 pages double–sided.
XP 000609036, dated Sep. 30, 1982, 3 pages double–sided.

* cited by examiner

*Primary Examiner*—Helen Pratt
(74) *Attorney, Agent, or Firm*—Paul & Paul

(57) ABSTRACT

Acidic protein foods employing pectin which has been low-molecularized to a viscosity of no greater than 150 mPa·s as a stabilizer for the acidic protein foods, wherein the pectin is added at greater than 0.4 wt % to the acidic protein foods. It is possible to achieve a wider stable pH range and improvement in palatable texture due to lower viscosity of the products.

5 Claims, No Drawings

ACIDIC PROTEIN FOODS, PROCESS FOR THEIR PRODUCTION AND STABILIZER

TECHNICAL FIELD

The present invention relates to acidic protein foods, to a process for their production and to a stabilizer for acidic protein foods.

BACKGROUND ART

Proteins in acidic milk beverages such as "liquid yogurt", lactic acid bacteria beverages, fruit milk and the like are highly unstable at near their isoelectric point of pH 3.8–5.3, such that the milk proteins coagulate, and with passage of time the milk proteins precipitate resulting in separation of the whey. Upon sterilization heating, this coagulation becomes severe to a point where the product value is totally lost.

In the past, it has been common to use pectin at 0.2–0.4 wt % in such acidic milk beverages such as liquid yogurt and lactic acid bacteria beverages in order to achieve stable dispersion of the proteins.

Pectin is an acidic polysaccharide typically present in high quantities in citrus fruits, apples, quince and the like, and galacturonic acid in the molecules can form crosslinking between proteins, resulting in stable dispersion of the proteins in the acidic milk beverages for given periods of time.

However, while addition of pectin can improve the stability of acidic milk beverages, it also increases their viscosity at the same time, resulting in a pasty feel, impairing the swallowability, or in extreme cases causing gelling, such that the manageability and product value are reduced.

There have been reported attempts to add low molecular pectin, subjected to enzymolysis or the like, to acidic milk beverages in order to reduce the viscosity of the acidic milk beverages (Carbohydrate Polymers, 6, P.361–378(1986), Japanese Unexamined Patent Publication No. 7-264977), but in all such cases it has been indicated that the stability is lowered with reduced molecular weight and that the use of low-molecularized pectin alone cannot stabilize acidic milk beverages.

Other inventions relating to the use of low-molecularized pectin include an invention employing thermolytically low-molecularized pectin as an emulsifier (which exhibits surface activity in water-in-oil systems) or emulsion stabilizer (which stabilizes water-in-oil emulsions) (Japanese Unexamined Patent Publication No. 10-4894), and an invention employing low-molecularized pectin obtained by action of endo-polygalacturonase on pectin, as food fiber (Japanese Unexamined Patent Publication No. 5-252972); however, none of these inventions teach that low-molecularized pectin obtained by pectin degradation contributes to dispersion stability of milk proteins under acidic conditions.

Moreover, the maximum pH of acidic milk beverages that can be stabilized by conventional pectin is at highest the isoelectric point of the proteins used, or up to pH 4.5 in the case of milk proteins, and since there has been no technique for stabilization of acidic milk beverages without production of a pasty feel in a pH range which is higher than the isoelectric point, there has been a limit to the flavors of acidic milk beverages that can be used.

DISCLOSURE OF THE INVENTION

It is an object of the present invention to provide acidic protein foods that simultaneous achieve improved stability of proteins under acidic conditions and enhanced palatable texture due to lower viscosity of the products, as well as a process for their production and to a stabilizer for acidic protein foods.

As a result of much diligent research directed toward achieving the object stated above, the present inventors have found that incorporation of low-molecularized pectin in acidic protein foods at above a specified content can stabilize the dispersion of milk proteins in the acidic protein foods while also lowering the viscosity of the acidic protein foods to give the products a more palatable texture, and can also widen the pH range in which stabilization is possible to above the isoelectric point. The present invention has been completed on the basis of this finding.

The invention therefore provides acidic protein foods containing low-molecularized pectin at greater than 0.4 wt %. The pectin is preferably low-molecularized to a degree such that the viscosity of a 5% solution at 25° C. is no greater than 150 mPa·s, and the acidic protein foods are typically beverages. The viscosity of the obtained beverages may be up to 10 mPa·s at 25° C.

The invention further provides a process for production of acidic protein foods which comprises using low-molecularized pectin at greater than 0.4 wt %, as well as a process for production of acidic protein foods whereby acidic protein foods containing non-low-molecularized pectin at greater than 0.4 wt % are heated at 100° C. or above. The invention still further provides a stabilizer for acidic protein foods which contains low-molecularized pectin as an active ingredient.

BEST MODE FOR CARRYING OUT THE INVENTION

The low-molecularized pectin used for the invention may be obtained by any known chemical or physical treatment capable of lowering the degree of polymerization of the pectin. As examples of such treatment there may be mentioned acid hydrolysis treatment, ultrasonic treatment, gamma ray treatment, mechanical decomposition treatment by shear force, β-elimination treatment with an alkali, oxidative decomposition using an oxidizing agent such as oxygen, chlorine, chlorite, hypochlorite, hydrogen peroxide, Fenton's reagent or the like, or decomposition with enzymes or microorganisms. When using an enzyme, pectin lyase, polygalacturonase, and combinations of pectin esterase and polygalacturonase are suitable.

The starting material for the low-molecularized pectin of the invention may be any source such as citrus fruits, apples, quince, roots or the like. Pectin obtained from citrus fruits, apples and quince, and particularly a high methoxyl type with a degree of esterification (DE value) of 50% or greater, is preferred from the standpoint of exhibiting an effect on dispersion stability across a wide range of low-molecularization.

Thermolytic treatment is preferred for preparation of the low-molecularized pectin, and this will be explained in detail below. Pectin is usually obtained by suspension of the raw source, i.e. citrus fruit peel or apple juice sediment in water, adjustment of the pH to 1–6, and then extraction under mechanical shear at a temperature of no higher than 100° C. and preferably 75–85° C., for a period of from a few minutes to a few hours, and preferably 30–120 minutes. The pectin extracted in this manner is then separated and collected from the suspension by centrifugal precipitation removal and/or by filtration using an aid such as perlite, diatomaceous earth or cellulose. The collected pectin solution is then subjected to thermolytic treatment involving heating to above 100° C., preferably 100–130° C., and maintenance of that temperature for a few minutes, preferably 5–15 minutes, to prepare low-molecularized pectin. The resulting low-molecularized pectin may be adequately concentrated by ultrafiltration or evaporation before precipitation with an alcohol (or metal salt), or before direct drying. This low-molecularized pectin obtained by thermolysis is then dried and powdered.

In this process, the low-molecularization and extraction of the pectin may be accomplished simultaneously, in which case the extraction of the pectin must be carried out in a temperature range in which the pectin undergoes decomposition, i.e. at 100° C. or above (under normal pressurized conditions), and preferably 100–130° C. The extraction time is set so that the viscosity of the pectin is within the specified range, and it may be determined as appropriate depending on the treatment temperature, after confirmation by preliminary experimentation.

The low-molecularization of the pectin may be accomplished at another stage of the industrial process, such as directly, or else during any of the steps of concentration, precipitation, powdering, etc. which are carried out after redissolution or reprecipitation under solventless conditions.

For enzymolysis, an enzyme with pectin-degrading activity may be added to a 1–5% pectin aqueous solution, and stirring carried out at 15–55° C. for 2 minutes to 24 hours followed by heating for inactivation of the enzyme. The low-molecularized pectin of the invention may remain in the form of the aqueous solution, but alternatively it may be powdered by addition of an alcohol to the treatment solution to precipitate the low-molecularized pectin, or spray drying.

The pectinase used for preparation of the low-molecularized pectin of the invention is not particularly limited so long as it can decompose and reduce the molecular weight of the pectin, and as examples there may be mentioned pectin lyase, polygalacturonase, and combinations of pectin esterase and polygalacturonase.

The low-molecularized pectin of the invention is decomposed to an extent at which it exhibits a viscosity of 150 mPa·s or lower when measuring a 5% aqueous solution with a type-B viscometer (Rotor No. 1, 60 rpm, 25° C.)

On the other hand, the low-molecularized pectin of the invention preferably exhibits a viscosity of 13 mPa·s or greater, more preferably 15–130 mPa·s and even more preferably 20–90 mPa·s for a 5% aqueous solution. The viscosity of 5% aqueous solutions of non-decomposed pectin is commonly 200 mPa·s or greater, and even more commonly 400 mPa·s or greater, and these can be altered depending on the source of the pectin and by the chemical properties such as the DE value.

When low-molecularized pectin according to the invention is used to produce acidic protein foods, it may be added in an amount exceeding 0.4 wt % with respect to the acidic protein foods, which has been considered unsuitable for conventional non-decomposed pectin. When low-molecularized pectin is used, it is not possible to achieve adequate dispersion stability at lower than 0.4 wt %. Addition in an amount of preferably 0.5 wt % or greater and more preferably 0.7 wt % or greater with respect to the acidic milk beverages can widen the pH range in which stabilization is possible to above the isoelectric point of the proteins.

While there are no particular restrictions on the upper limit for addition, it is preferably used at no greater than 5.0 wt % in the acidic protein foods in order to limit the viscosity of acidic milk beverage products to 10 mPa·s to prevent a pasty feel or impaired swallowability.

Reduction in the product viscosity for production of an acidic protein food according to the invention can be achieved by adding non-decomposed or low-molecularized pectin to an acidic milk beverage in an amount exceeding 0.4 wt %, preferably 0.5 wt % or greater and more preferably 0.7 wt % or greater, for stabilization of the acidic protein food, and then heating and especially retort heating thereof to 100° C. or higher. Conventional acidic milk beverages require no sterilization treatment at 100° C. or above because of their acidic range, and since addition of large amounts of pectin raises the viscosity, pectin has not been added to acidic milk beverages in amounts exceeding 0.4 wt %.

The acidic protein foods of the invention are acidic protein foods containing animal and vegetable proteins, and they include acidic protein beverages prepared by adding citrus juices or other juices, or organic acids such as citric acid and lactic acid, or inorganic acids such as phosphoric acid, to beverages comprising animal or vegetable proteins such as milk, soybean milk and the like; acidic milk beverages obtained by acidifying dairy products; acidic frozen desserts such as acidic ice cream and frozen yogurt obtained by adding fruit juices to frozen desserts containing milk components, such as ice cream and the like; acidic desserts obtained by adding fruit juices, etc. to gelled foods such as puddings and Bavarian cream, as well as acidic milk beverages such as lactic acid bacteria beverages (including live bacteria and sterilized types), fermented milk (in solid or liquid form), and the like. Animal and vegetable proteins include cow milk, goat milk, skim milk, soybean milk and whole milk powder or skim milk powder obtained by powdering these, as well as sugar-added milk, condensed milk, processed milk obtained by fortification with minerals such as calcium or vitamins, fermented milk, and the proteins obtained from the same. Fermented milk refers to fermented milk obtained by addition of a lactic acid bacteria starter and fermentation after sterilization of the animal or vegetable proteins, and it may be further powdered or sugar may be added thereto, as desired.

Examples are provided below for a more detailed explanation of the preferred mode of the invention, with the understanding that they are exemplary and are not intended to restrict the spirit of the invention. The "parts" and "%" values in the examples are based on weight.

EXAMPLE 1 a) Preparation of Low-Molecularized Pectin by Enzymolysis

After decomposition and dissolution of 100 g of pectin with a DE value of 71% (trade name: "Pectin SM-478", by San-Ei Gen FFI Co., Ltd.) in approximately 1800 g of desalted water heated to 85° C., the solution was cooled to 30° C. and desalted water was added to a total volume of 2000 g, and then 1.0 g of a pectin lyase enzyme solution (trade name: "Pektolase LM", by Grinstead Products Co.) was added, and stirring was continued for 2 hours for decomposition reaction. After 2 hours had passed, the treatment solution was contacted with a boiling water bath to deactivate the enzyme, after which the solution was cooled and corrected for the evaporated moisture, and then the insoluble portion was removed by centrifugal separation and the low-molecularized pectin solution was recovered. The recovered sample was placed in a thermostatic water tank at 25° C. for 60 minutes, and measurement of the viscosity with a type-B viscometer (Rotor No. 1, 60 rpm, 25° C.) gave a viscosity value of 58.0 mPa·s. The obtained low-molecularized pectin was used to prepare acidic milk beverages with the compositions shown in Table 1, and their stability was evaluated. The viscosity of a 5% solution of the non-decomposed pectin before enzymolysis was 279.0 mPa·s.

TABLE 1

Composition for evaluation of milk protein dispersion stabilizing function

| Pectin | (5% solution) | 6, 10 and 14 parts |
|---|---|---|
| Sugar solution | (50% solution) | 18 parts |
| Milk | | 50 parts |
| Citric acid solution | Adjusted from a pH of 3.8 to 5.3 with a 50% solution | |
| Water | Adjusted to a total of 100 parts | | b) Simple Stability Test for Low-Molecularized Pectin

An acidic milk beverage was prepared with the composition of Table 1 to a total of 1000 g. Specifically, a 50% citric acid solution was added dropwise to milk beverages comprising the pectin solution to amounts of 0.3 part (0.3% with respect to the total of the acidic milk beverage), 0.5 part (0.5%) and 0.7 part (0.7%) of the low-molecularized pectin prepared in a), and then the pH of each product was adjusted from 3.8 to 5.3 in increments of 0.3. After pH adjustment, a homogenizer was used for homogenization at 150 kgf/cm² to complete the milk beverages. The viscosity was measured with a type-B viscometer (Rotor No. 1, 60 rpm, 25° C.) and the condition was observed, for each of the obtained acidic milk beverage products. A 200 g portion of each of the acidic milk beverages was filled into a retort bag, sterilization was carried out at 80° C. for 20 minutes or at 121° C. for 10 minutes, and the condition was observed. The results of evaluation are summarized in Table 2.

then 100 g portions were filled into retort bags for thermolytic treatment under the conditions shown in Table 3. After the thermolysis, the recovered samples were placed in a thermostatic water tank at 25° C. for 60 minutes, and the viscosity was measured with a type-B viscometer (Rotor No. 1, 60 rpm, 25° C.). The results are shown in Table 3.

TABLE 3

| No. | Thermolysis conditions | 5% solution viscosity |
|---|---|---|
| 1 | Control (unheated) | 263.0 |
| 2 | 80° C., 10 min. | 262.5 |
| 3 | 100° C., 10 min. | 190.0 |
| 4 | 105° C., 10 min. | 162.0 |
| 5 | 110° C., 10 min. | 126.0 |
| 6 | 115° C., 10 min. | 85.5 |
| 7 | 121° C., 10 min. | 54.5 |
| 8 | 124° C., 10 min. | 33.1 |
| 9 | 128° C., 10 min. | 18.7 |
| 10 | 121° C., 20 min. | 24.0 |
| 11 | 121° C., 30 min. | 12.8 |

The above results confirmed that thermolysis at 100° C. or higher produces a reduction in viscosity of pectin solutions.

Each of the low-molecularized pectin solutions (5%) obtained in c) above were used to prepare acidic milk beverages with the composition shown in Table 4, and their stability was evaluated.

TABLE 2

| Low-molecularized pectin content | Acidic milk beverage preparation pH | Viscosity (mPa · s) | Before heating | After 80° C. sterilization | After 121° C. sterilization |
|---|---|---|---|---|---|
| 0.7 part (0.7%) | pH 3.8 | 24.8 | coagulation | notable coagulation | notable coagulation |
| " | pH 4.1 | 7.2 | stable | stable | stable |
| " | pH 4.4 | 6.5 | stable | stable | stable |
| " | pH 4.7 | 6.2 | stable | stable | stable |
| " | pH 5.0 | 9.8 | stable | stable | stable |
| " | pH 5.3 | 7.4 | coagulation | notable coagulation | notable coagulation |
| 0.5 part (0.5%) | pH 3.8 | 19.6 | coagulation | notable coagulation | notable coagulation |
| " | pH 4.1 | 5.2 | stable | stable | little coagulation |
| " | pH 4.4 | 5.6 | stable | stable | stable |
| " | pH 4.7 | 6.0 | stable | stable | stable |
| " | pH 5.0 | 9.8 | stable | coagulation | notable coagulation |
| " | pH 5.3 | 7.4 | coagulation | notable coagulation | notable coagulation |
| 0.3 part (0.3%) | pH 3.8 | 25.7 | coagulation | notable coagulation | notable coagulation |
| " | pH 4.1 | 8.0 | coagulation | coagulation | notable coagulation |
| " | pH 4.4 | 5.3 | slight coagulation | coagulation | notable coagulation |
| " | pH 4.7 | 10.0 | coagulation | notable coagulation | notable coagulation |
| " | pH 5.0 | 16.1 | coagulation | notable coagulation | notable coagulation |
| " | pH 5.3 | 5.7 | coagulation | notable coagulation | notable coagulation |

As clearly seen by the results in Table 2, using the low-molecularized pectin as a stabilizer in an amount of 0.5 part (0.5%) or greater according to the invention improves the stability of acidic milk beverages while also lowering the viscosity. The stabilized products maintained their stable condition even after retort sterilization at 121° C.

EXAMPLE 2 c) Preparation of Low-Molecularized Pectin by Thermolysis

After dispersion and dissolution of 100 g of pectin with a DE value of 71% (trade name: "Pectin SM-478", by San-Ei Gen FFI Co., Ltd.) in approximately 1800 g of desalted water heated to 85° C., the solution was cooled to 30° C. and desalted water was added to a total volume of 2000 g, and

TABLE 4

Composition for evaluation of milk protein dispersion stabilizing function

| Pectin solution | (5% solution) | 14 parts |
|---|---|---|
| Sugar solution | (50% solution) | 18 parts |
| Milk | | 50 parts |
| Citric acid solution | Adjusted to a pH of 4.7 with a 50% solution | |
| Water | Adjusted to a total of 100 parts | | d) Simple Stability Test for Low-Molecularized Pectin

An acidic milk beverage was prepared with the composition of Table 4 to a total of 1000 g., Specifically, pectin was added in an amount of 0.7 part each (0.7% with respect to the total of the acidic milk beverage), a 50% citric acid solution was added dropwise, and then the pH was adjusted to 4.7 and a homogenizer was used for homogenization at 150 kgf/cm² to complete the product. The viscosity of the obtained acidic milk beverage product was measured with a type-B viscometer (Rotor No. 1, 60 rpm, 25° C.) and the condition thereof was observed. After filling 50 g portions of the acidic milk beverage into retort bags, sterilization was carried out at 80° C. for 20 minutes and at 121° C. for 10 minutes, after which the condition was observed and the following parameters were measured.

Whey Separation Evaluation:

A 20 g portion of the heat sterilized evaluation beverage was precisely measured out and subjected to centrifugal separation for 20 minutes at 750 g using a centrifugal separator (model H-103N, by Kokusan Co., Ltd.), and after observation of the whey separation, the whey was removed and set onto filter paper for 20 minutes, after which the whey was thoroughly removed and the precipitate weight measured, and the milk protein precipitation rate was determined by the following formula.

Milk protein precipitation rate (%)=weight of precipitate/weight of sample×100

Table 5 shows the viscosity of each of the acidic milk beverages and the change in the condition of the acidic milk beverages and the milk protein precipitation rates after sterilization.

to no greater than 10 mPa·s, and to enhance the swallowability of the products and avoid a pasty feel.

Furthermore, the viscosities of the acidic milk beverages after 121° C. sterilization were all reduced to under 4.0 mPa·s, no pasty feel was observed, and satisfactory swallowability was exhibited. This confirmed that an equivalent effect is exhibited even with low molecularization of pectin by heating at 100° C. or higher after preparation of acidic protein foods.

EXAMPLE 3

Using apple juice sediment (product name: Apple Fiber, by Nitro Co., 5% moisture content) as the pectin extract starting material, 500 g of the apple juice sediment was suspended in 9500 g of water, the pH was adjusted to 4.5, and then the suspension was heated at 120° C. for 30 minutes for simultaneous extraction and low molecularization of the pectin. After cooling, it was subjected to centrifugal separation (10,000 g×30 minutes), the supernatant and precipitate were separated, an equivalent weight of water was added to the separated precipitate, centrifugal separation was repeated, the supernatant was combined with the previous supernatant, after which ethanol was added to an alcohol concentration of 80% for purification of the precipitate. The recovered precipitate portion was lyophilized to prepare low-molecularized pectin. Using this apple juice-derived low-molecularized pectin, the acidic milk beverage stabilizing power at pH 4.7 was observed in the same manner as Example 2, and satisfactory acidic milk with a viscosity of 6.0 mPa·s was obtained. The viscosity of a 5% solution of the low-molecularized pectin was 14.0 mPa·s.

TABLE 5

| No. | Pectin solution viscosity (5%) | Upper row: Condition (precipitation rate)/ lower row: Viscosity (palatable texture)* | | |
|---|---|---|---|---|
| | | Before heating | After 80° C. sterilization | After 121° C. sterilization |
| 1 | 263.0 | stable (0.8%) 36.1 (++) | stable (0.7%) 36.2 (++) | stable (0.9%) 3.9 (−) |
| 2 | 262.5 | stable (0.5%) 33.5 (++) | stable (0.7%) 33.2 (++) | stable (1.1%) 3.6 (−) |
| 3 | 190.0 | stable (0.6%) 20.5 (++) | stable (0.8%) 18.9 (++) | stable (1.0%) 3.4 (−) |
| 4 | 162.0 | stable (0.7%) 14.3 (++) | stable (0.9%) 14.3 (++) | stable (1.3%) 3.4 (−) |
| 5 | 126.0 | stable (0.5%) 8.9 (−) | stable (0.6%) 8.8 (−) | stable (1.0%) 3.5 (−) |
| 6 | 85.5 | stable (0.5%) 7.2 (−) | stable (0.6%) 7.0 (−) | stable (1.1%) 3.4 (−) |
| 7 | 54.5 | stable (0.8%) 6.9 (−) | stable (0.9%) 7.0 (−) | stable (1.1%) 2.9 (−) |
| 8 | 33.1 | stable (0.8%) 6.2 (−) | stable (1.0%) 6.5 (−) | stable (1.2%) 3.0 (−) |
| 9 | 18.7 | stable (1.2%) 5.8 (−) | stable (1.0%) 6.2 (−) | stable (1.7%) 3.4 (−) |
| 10 | 24.0 | stable (0.8%) 6.0 (−) | stable (1.0%) 6.2 (−) | stable (1.5%) 3.2 (−) |
| 11 | 12.8 | coagulation (10.0%) 13.7 (++) | notable coagulation (23.0) 4.3 (++) | notable coagulation (14.9%) 3.1 (++) |

*: ++ (pasty feel)
--→ — (no pasty feel)

As clearly seen by the results in Table 5, by using as a stabilizer pectin which has been low-molecularized to a viscosity of between 13 mPa·s and 130 mPa·s at a 5% solution, it is possible to improve the stability of acidic milk beverages while also lowering the viscosity of the products

COMPARATIVE EXAMPLE 1

Acidic milk beverages with the compositions shown in Table 1 were obtained in the same manner as Example 1 except that pectin with a DE value of 71% (trade name: "Pectin SM-478", by San-Ei Gen FFI Co., Ltd.) was used, and the stability thereof was evaluated. The results of the evaluation are summarized in Table 6.

TABLE 6

| Pectin content | Acidic milk beverage preparation pH | Upper row: Condition (precipitation rate)/ lower row: Viscosity (palatable texture)* | | |
|---|---|---|---|---|
| | | Before heating | After 80° C. sterilization | After 121° C. sterilization |
| 0.7 part (0.7%) | pH 3.8 | stable (1.8%) 36.1 (++) | little coagulation (1.7%) 42.2 (++) | coagulation (2.9%) 12.7 (+) |
| 0.7 part (0.7%) | pH 4.1 | stable (0.5%) 20.5 (++) | stable (0.8%) 15.8 (++) | stable (1.3%) 4.4 (−) |
| 0.7 part (0.7%) | pH 4.4 | stable (0.6%) 29.5 (++) | stable (0.8%) 32.5 (++) | stable (1.1%) 4.3 (−) |
| 0.7 part (0.7%) | pH 4.7 | stable (0.7%) 36.1 (++) | stable (0.9%) 36.2 (++) | stable (1.0%) 3.9 (−) |
| 0.7 part (0.7%) | pH 5.0 | gelling (1.1%) 62.2 (++) | sol (1.5%) 42.4 (++) | stable (1.7%) 6.5 (−) |
| 0.7 part (0.7%) | pH 5.3 | coagulation (3.1%) 50.1 (++) | coagulation (22.5%) 49.1 (++) | coagulation (18.2%) 9.3 (+) |
| 0.5 part (0.5%) | pH 3.8 | stable (2.4%) 19.5 (++) | little coagulation (2.5%) 23.5 (++) | coagulation (18.2%) 39.3 (++) |
| 0.5 part (0.5%) | pH 4.1 | stable (0.7%) 20.5 (++) | stable (1.3%) 21.8 (++) | stable (1.1%) 3.8 (−) |
| 0.5 part (0.5%) | pH 4.4 | stable (0.6%) 30.2 (++) | stable (0.8%) 29.9 (++) | stable (1.0%) 4.0 (−) |
| 0.5 part (0.5%) | pH 4.7 | stable (0.7%) 33.5 (++) | stable (0.9%) 35.8 (++) | stable (1.3%) 4.7 (−) |
| 0.5 part (0.5%) | pH 5.0 | stable (2.4%) 49.5 (++) | little coagulation (2.4%) 52.5 (++) | coagulation (8.2%) 19.3 (++) |
| 0.5 part (0.5%) | pH 5.3 | coagulation (5.4%) 26.4 (++) | coagulatioin (22.5%) 22.5 (++) | coagulation (18.2%) 7.3 (+) |
| 0.3 part (0.3%) | pH 3.8 | coagulation (7.0%) 22.5 (++) | coagulation (22.5%) 23.2 (++) | coagulation (16.9%) 19.3 (++) |
| 0.3 part (0.3%) | pH 4.1 | stable (2.9%) 16.7 (++) | coagualtion (22.5%) 14.5 (++) | coagulation (20.9%) 5.6 (−) |
| 0.3 part (0.3%) | pH 4.4 | stable (1.2%) 13.5 (+) | stable (1.1%) 18.9 (++) | coagulation (11.5%) 3.4 (−) |
| 0.3 part (0.3%) | pH 4.7 | coagulation (12.7%) 26.4 (++) | coagulation (14.7%) 22.5 (++) | coagulation (12.5%) 7.3 (+) |
| 0.3 part (0.3%) | pH 5.0 | coagulation (7.2%) 19.5 (++) | coagulation (15.9%) 23.5 (++) | coagulation (9.1%) 3.6 (−) |
| 0.3 part (0.3%) | pH 5.3 | coagulation (6.3%) 19.5 (++) | coagulation (12.4%) 23.5 (++) | coagulation (15.1%) 3.6 (−) |

*: ++ (pasty feel)
--→ — (no pasty feel)

As clearly shown by the results in Table 6, an increasing amount of pectin addition improves the acidic milk beverage stability, but an increase in viscosity is also observed, while gelling was confirmed with further increase in addition. However, it was confirmed that by using pectin as a stabilizer at 0.5 part (0.5% with respect to the total of the acidic milk beverage) or greater, the stabilized product maintained a stable condition by retort sterilization at 121° C., thus making it possible to achieve lower viscosity for the product.

INDUSTRIAL APPLICABILITY

According to the present invention, acidic milk beverages employing low-molecularized pectin in an amount of greater than 0.4 wt % as acidic milk beverage stabilized compositions can widen the pH range in which stabilization is possible while also achieving low viscosity, and therefore improvement in palatable texture, such as swallowability, may be realized.

What is claimed is:

1. An acidic protein beverage containing low-molecularized pectin at greater than 0.4 wt % wherein the pectin is low-molecularized to a degree such that the viscosity of a 5% solution of the low-molecularized pectin at 25° C. is no greater than 150 in mPa·s, wherein the viscosity of the beverage is no greater than 10 mPa·s at 25° C.

2. A process for production of an acidic protein food which comprises adding low-molecularized pectin at greater than 0.4 wt % to an acidic protein food wherein the pectin is low-molecularized to a degree such that the viscosity of a 5% solution of the low-molecularized pectin at 25° C. is no greater than 130 mPa·s.

3. A process for production of an acidic protein food which comprises heating an acidic protein food containing non-low-molecularized pectin at greater than 0.4 wt % at 100° C. or above to cause the pectin to be low-molecularized to a degree such that the viscosity of a 5% solution of the low-molecularized pectin at 25° C. is no greater than 150 mPa·s.

4. A stabilizer for an acidic protein beverage or frozen dessert comprising milk protein such as milk or soybean milk which contains low-molecularized pectin as an active ingredient wherein the pectin is low-molecularized to a degree such that the viscosity of a 5% solution of the low-molecularized pectin at 25° C. is no greater than 130 mPa·s.

5. An acidic protein beverage or frozen dessert comprising milk protein such as milk or soybean milk comprising the stabilizer according to claim 4.

* * * * *